(12) United States Patent
King et al.

(10) Patent No.: US 12,261,898 B1
(45) Date of Patent: *Mar. 25, 2025

(54) SPLIT STREAMING SYSTEM AND METHOD

(71) Applicant: Ignite Technologies, Inc., Austin, TX (US)

(72) Inventors: Michael J. King, Camas, WA (US); John W. Morris, IV, Washougal, WA (US); Brian S. Bosworth, Wheeling, WV (US)

(73) Assignee: Ignite Technologies, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,921

(22) Filed: Nov. 6, 2023

Related U.S. Application Data

(63) Continuation of application No. 18/066,259, filed on Dec. 14, 2022, now Pat. No. 11,848,974, which is a continuation of application No. 17/350,462, filed on Jun. 17, 2021, now Pat. No. 11,558,442, which is a continuation of application No. 16/848,573, filed on Apr. 14, 2020, now Pat. No. 11,070,602, which is a continuation of application No. 16/266,726, filed on Feb. 4, 2019, now Pat. No. 10,659,503, which is a continuation of application No. 15/697,536, filed on Sep. 7, 2017, now Pat. No. 10,200,426, which is a continuation of application No. 14/551,684, filed on Nov. 24, 2014, now Pat. No. 9,774,644, which is a continuation of application No. 12/265,581, filed on Nov. 5, 2008, now Pat. No. 8,904,022.

(Continued)

(51) Int. Cl.
| | |
|---|---|
| *H04L 65/611* | (2022.01) |
| *H04L 65/80* | (2022.01) |
| *H04N 21/2343* | (2011.01) |
| *H04N 21/63* | (2011.01) |
| *H04N 21/6405* | (2011.01) |
| *H04N 21/6408* | (2011.01) |

(52) U.S. Cl.
CPC ............ *H04L 65/611* (2022.05); *H04L 65/80* (2013.01); *H04N 21/234327* (2013.01); *H04N 21/631* (2013.01); *H04N 21/6405* (2013.01); *H04N 21/6408* (2013.01)

(58) Field of Classification Search
None
See application file for complete search history.

(56) References Cited

U.S. PATENT DOCUMENTS

| | | | | |
|---|---|---|---|---|
| 2002/0040479 | A1* | 4/2002 | Ehrman | H04L 65/70 |
| | | | | 725/86 |
| 2004/0143672 | A1* | 7/2004 | Padmanabham | H04L 67/1076 |
| | | | | 709/231 |

(Continued)

OTHER PUBLICATIONS

Acceptance of Request Under Rule 48 mailed Oct. 13, 2023, filed in U.S. Appl. No. 18/066,259, p. 1.

(Continued)

*Primary Examiner* — Mohamed Ibrahim

(57) ABSTRACT

A split streaming system and method are provided in which a stream of data (that can be video, audio or textual data) is split and sent over a plurality of stream reflectors to a stream recipient. Each stream reflector performs time gradient replacement to manage the split streaming.

16 Claims, 3 Drawing Sheets

Related U.S. Application Data

(60) Provisional application No. 61/002,014, filed on Nov. 5, 2007.

(56) References Cited

U.S. PATENT DOCUMENTS

| | | | | | |
|---|---|---|---|---|---|
| 2009/0077254 | A1* | 3/2009 | Darcie | ............... | H04N 21/4788 709/231 |
| 2010/0049867 | A1* | 2/2010 | Panwar | .............. | H04N 21/4788 709/204 |
| 2014/0122656 | A1* | 5/2014 | Baldwin | ............... | H04W 12/08 709/219 |

OTHER PUBLICATIONS

Request Under Rule 48 dated Oct. 4, 2023. filed in U.S. Appl. No. 18/066,259, p. 1-2.
Notice of Allowance mailed Aug. 4, 2023, filed in U.S. Appl. No. 18/066,259, p. 1-4.
Terminal Disclaimer approved Jul. 21, 2023, filed in U.S. Appl. No. 18/066,259, p. 1.
Terminal Disclaimer filed Jul. 21, 2023, filed in U.S. Appl. No. 18/066,259, p. 1-3.
Notice to File Missing Parts mailed Jan. 18, 2023, filed in U.S. Appl. No. 18/066,259, p. 1-2.
Non-Final Office Action mailed Apr. 21, 2023, filed in U.S. Appl. No. 18/066,259, p. 1-10.

* cited by examiner

SPLIT STREAMING SYSTEM AND METHOD

PRIORITY CLAIM

This application claims the benefits under 35 USC 119 (e) and priority under 35 USC 120 to U.S. Provisional Patent Application Ser. No. 61/002,014 filed on Nov. 5, 2007 and entitled "Split Streaming" which is incorporated herein by reference.

FIELD

The disclosure relates to a digital data communications system and method and in particular to a Real-time digital data streaming system and method.

BACKGROUND

The streaming of digital data is known. Typically, unicast streaming is used in which a media server is coupled to a digital data stream client and the digital data is streamed to the client over a network. However, unicast streaming requires that every client is directly connected to the media server which results in a complex network architecture and requires the entire stream bandwidth for each digital data stream which is inefficient. The unicast streaming is also less able to adapt to changing network conditions. Thus, it is desirable to provide a split streaming system and method that overcomes the limitations of unicast streaming and it is to this end that the system and method are is directed.

DETAILED DESCRIPTION OF ONE OR MORE EMBODIMENTS

The system and method are particularly applicable to a web-based client/server architecture system implementation and it is in this context that the system and method will be described. It will be appreciated, however, that the system and method has greater utility, such as to other implementations and other architectures.

Figure 1:
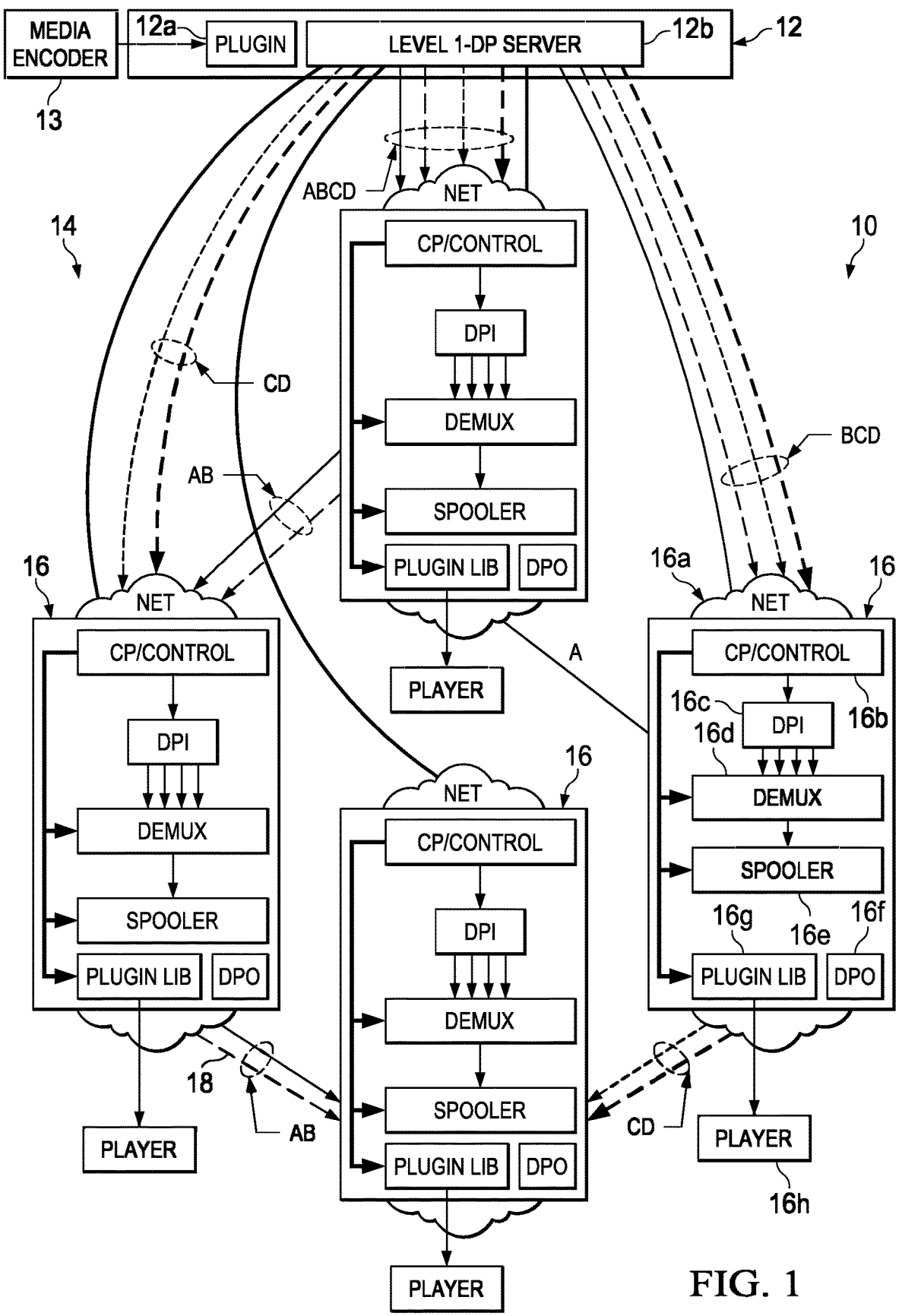
FIG. 1 illustrates an example of an implementation of a split streaming system.

FIG. 1 illustrates an example of an implementation of a split streaming system 10. The split streaming system may have a large population of data stream receivers 16 with only a very few of these data stream receivers directly connected to a streaming unit 12. The split streaming system can operate in a specialized one-to-many, and many-to-one, communication patterns amongst themselves to effect full-stream streaming of electronic streaming content to an entire body 14 of data stream receivers, thus greatly increasing the efficiency of bandwidth utilization for full content streaming to a large body of data stream receivers.

The split streaming system 10 comprises the streaming unit 12 that may receive various type of digital data such as video, audio or music which are encoded using a media encoder 13 that may be implemented as a plurality of lines of computer code in one embodiment that is a codec that converts the incoming digital data into an encoded format. The streaming unit 12 further comprises a plug-in 12a and a level 1 device 12b. The plug-in 12a connect to various types of known media encoders and encapsulates the data into a format ready for distribution by the system 10. These plug-in elements are completely modular, to allow the system to adapt to many streaming types. The Level 1 device 12b is the very first level of the system network packet distribution that can transmit any number of channels to a requesting data stream receiver. The streaming unit 12 may be implemented as one or more known server computers that include the plug-in 12a and the level 1 device 12b. The streaming unit 12 may prepare the digital data and then stream the digital data to the body 14 of the data stream receivers 16. The streaming unit 12 may also have a time gradient unit that sets and adjusts the time gradient for each data stream receiver as described below in more detail with reference to FIG. 3. As shown in FIG. 1, the streaming unit 12 streams out various streams (such as ABCD which is a complete stream of digital data in the example shown in FIG. 1, CD, or BCD (which are sub-portions of the complete stream)) to a number of the data stream receivers 16. An example of the various streams that are communicated using the body 14 are shown in FIG. 1. Unlike a typical unicast system in which each data stream receiver is connected to the streaming unit 12, the split stream system 10 has only a few data stream receivers directly connected to the streaming unit 12 which reduces the complexity of the split streaming system network.

Each data stream receiver may receive an entire stream (with ABCD portions in the example in FIG. 1) wherein the stream may be communicated to the data stream receiver by the streaming unit 12 or by another data stream receiver 16 in the body. For example, the data stream receiver 16 at the bottom of FIG. 1 receives its complete stream from two other data stream receivers that communicate AB and CD, respectively, to the particular data stream receiver. The technique in each data stream receiver for handling the multiple partial or complete data streams is described below in more detail. In the system, each data stream receiver may receive a stream, but may also act as streaming unit by distributing all or only portions of full stream content whereby all data stream receivers in the body 14 ultimately receive the entire content of a stream of streamed electronic content data.

Each data stream receiver 16 may be a processing unit based device with sufficient computing power, memory and connectivity to interact with the streaming unit 12. For example, each data stream receiver may be personal computer, laptop computer, server computer, terminal, etc. . . . Each data stream receiver 16 may further comprise a network interface (NET) 16a, CP/control unit 16b, a DPI unit 16c, a demultiplexer (DEMUX) unit 16d, a spooler unit 16e, a DPO unit 16f and a plugin library 16g, each of which may be implemented as one or more lines of computer code being executed by the processor unit(s) of the processing unit based device. Net 16a represents a network or network interface that each data stream receiver is connected to. The CP/Control 16b is the network connection to the streaming unit 12 that allows the streaming unit logic to measure and control the connectivity direction (the connections between the data stream receivers in the network 14) and quality of service of the data stream receivers in real-time. The DPI (data port in) unit 16c is a set of subsystems (composed of a plurality of lines of computer code) that allows each data stream receiver to connect to another data stream receiver for reception of any number of data channels the data stream receiver requires—allowing it to be a child (receive one or more channels for data stream components.) The DPI connects to a DPO as described below. The DEMUX 16*d* or demultiplexer sub-systems, receives the system data packets from the DPI subsystems and removes the raw codec data that was generated by the encoder 13. The spooler unit 16*e* is a set of subsystems that continually measure the state conditions of the data stream receiver, including the system buffer levels. It is responsible for communicating to the streaming unit using the CP/Control (16*b*) sub-systems about potential errors or QOS issues, so that the streaming unit can make decisions for any corrective action. The DPO (data port out) 16*f* provides the opposite functionality of the DPI in that it provides channels of data stream data packets to a data stream receiver, allowing the particular data stream receiver to be a parent (communicate channels to other data stream receivers.) The plug-in library 16*g* provides an interface and emulation system that matches that of the encoder 13. The spooler provides codec data packets that have been processed by the demultiplexer and delivers them to the plug-in interface. From the point of view of the player, the plug-in system "looks" just like encoder 13.

Each data stream receiver 16 may further comprise a player 16*h* that allows the user of the particular data stream receiver to play the stream that has been communicated to the particular data stream receiver 16 such as ABCD in the example shown in FIG. 1. Further details of the system 10 shown in FIG. 1 are described in commonly owned U.S. Pat. No. 6,870,937 which is incorporated herein by reference.

In one implementation, the split stream system 10 is a client-server based distributed streaming media software technology for use in one-to-many real-time streaming. The distributed streaming network reduces the number of clients 16 directly connected to the media server by up to 98 percent based on the bitrate of the source stream and the connection capacity of the audience. This distributed network is created by having able end-users (or clients) act as servers for one to several other clients by distributing the complete stream, or a portion of the stream using any available, unused upstream bandwidth. The streaming unit 12 continuously and closely manages the distributed network. If, at any time, a distributing client 16 becomes unable to continue to relay the stream to its receiving clients, those receiving clients are moved to other distributing clients or directly back to the streaming unit 12 without interruption, or skipping in the stream. The streaming unit 12 optimization routines continuously monitor and adjust the network topology to create the most efficient, most stable, and highest quality distributed streaming network possible. The plug-in 16*g* provides end-to-end quality of service monitoring and real-time network healing creating a stream with less skipping, buffering and breaks than standard unicast streaming.

The split streaming system 10 shown in FIG. 1 provides a higher quality, more stable, more efficient, and lower cost streaming solution compared to unicast streaming. Due to the split streaming and fewer data stream receivers connected to the steaming unit 12 as described above, the number of data stream receivers directly connected to the streaming unit 12 does not grow linearly with audience size so that the system can scale more easily and does not require as much audience size estimation, architecture over allocation, and infrastructure planning. Due to the split streaming (as described below in more detail), the system 10 is a more stable, distributed network that can adapt more effectively to changing network conditions since streams or partial streams can be re-routed in the network. The system is fully compatible with standard Digital Right Management, streams media in the same major streaming formats and the requirements for creating a source stream are the same for the system 10 as they are for unicast systems. In addition, end-users use the standard media player clients to view or listen to the streaming content that is delivered to them.

Figure 2:
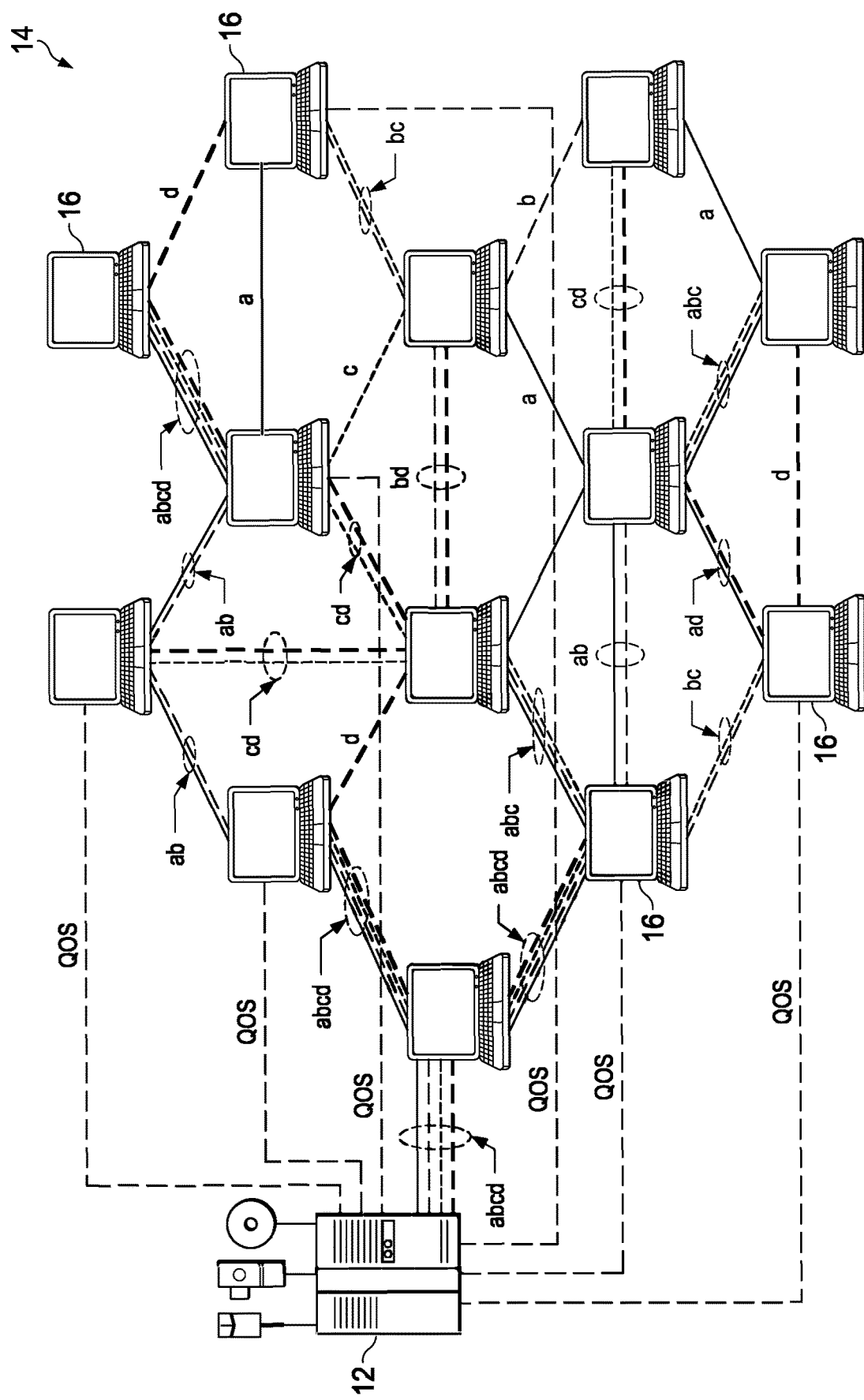
FIG. 2 illustrates an example of the operation of the split streaming system.

FIG. 2 illustrates an example of the operation of the split streaming system 10 with the streaming unit 12 and a plurality of data stream receivers 16. As shown in FIG. 2, each data stream (such as a stream with components/portions A, B, C and D) can be broken down into channels to further increase the networks efficiency. This process is known as SplitStreaming™. This technology enhancement was created to increase the distributed streaming networks efficiency especially when streaming higher bitrate video content across asynchronous residential broadband connections. This enhancement allows the streaming unit 12 and the data stream receivers 16 to send portions of the stream to a particular data stream receivers 16. The particular data stream receiver 16 in this scenario has multiple sending units and then has the ability to combine the channels to recreate the single source stream. This technology enhancement improves the efficiency of high bitrate streaming common to streaming video. The example below shows a 4 channel SplitStream™ (with the channels shown as A, B, C and D). If, for example, the source stream shown in FIG. 2 is a 400 Kbps stream then each channel would be 100 Kbps. In an example, residential broadband connects with 4 Mbps downstream and 384 Kbps upstream, the SplitStream™ below would allow a data stream receiver to distribute 300 Kbps (3 Channels) to another data stream receiver. Without SplitStreaming™, each data stream receiver would not have been able to distribute any stream because 400 Kbps is greater than the available 384K upstream.

In one implementation, the system may have a set of early stage data stream receivers that connect directly to the streaming unit. The system may also implement, from these early stage data stream receivers, a distribution channel non-redundant, one-to-many and many-to-one full-stream or partial-stream channels to the other data stream receivers whereby all data stream receivers in the mentioned field ultimately receive a full stream.

Figure 3:
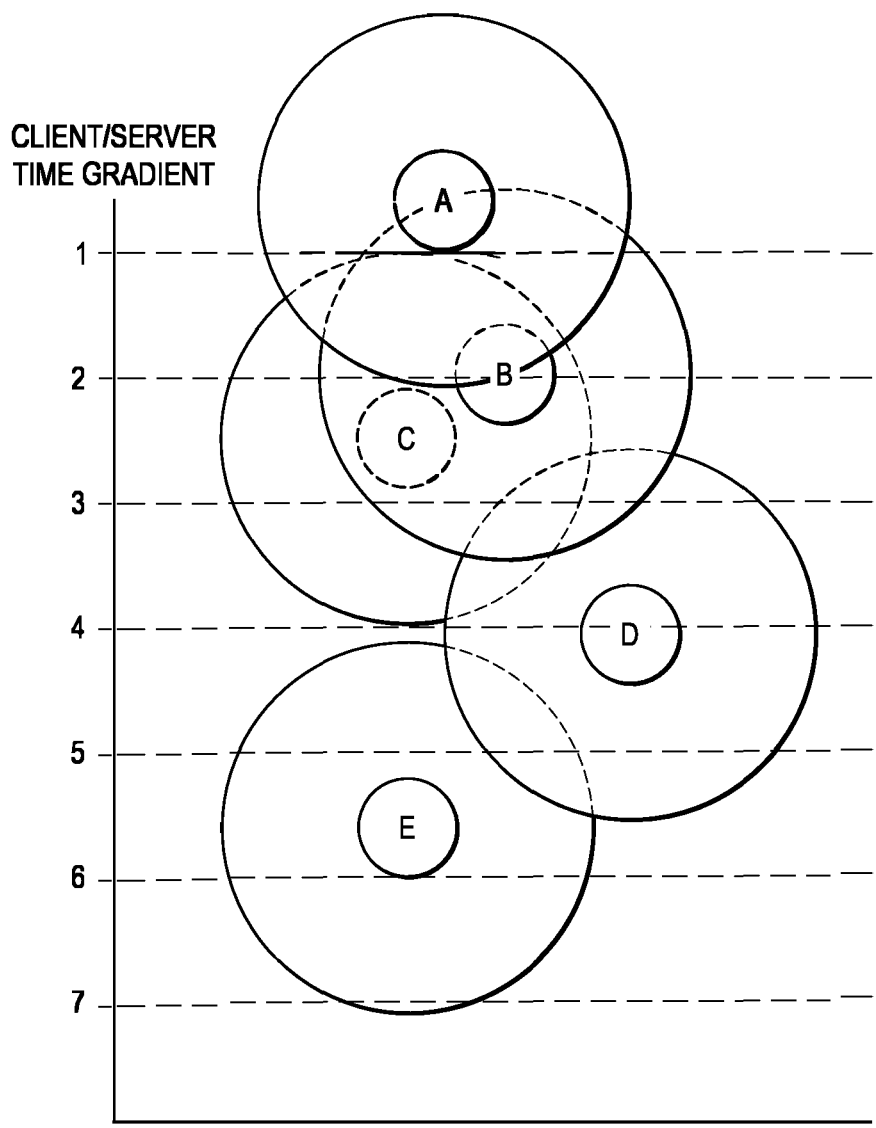
FIG. 3 illustrates an example of a time gradient placement method utilized by the split streaming system.

FIG. 3 illustrates an example of a time gradient placement method utilized by the split streaming system. Within any point to point communication, the amount of latency can increase as the number of nodes between two end points increase and the result of this type of time congestion can sometimes (in extreme cases) lead to multi-second delays from initial transmit, to actual reception of the packet which can cause poor QOS to the end user and the nodes of the network shift around far too much-potentially compounding the problems.

In the system 10, each data stream receiver 16 (such as receivers A, B, C, D and E as shown in FIG. 3) on the network stores a predetermined amount of data, such as 30 seconds worth of individual packets in a stack. The top of the stack is the last packet that has been delivered by the streaming unit, or another node. If two nodes have many nodes in between them (in an hp2p configuration), there is a good chance that the top of their stacks has a time difference between them.

For example, receiver C is receiving data from receiver B and receiver E is at the bottom of a peer chain, and experiencing quite a bit of latency-relative to the timecode that the streaming unit is sending. The chart in FIG. 3 shows that receiver C has a 2.5 second difference with the streaming unit output (indicating a 2.5 second delay), whereas receiver E is a good 5.5 seconds behind the streaming unit. If receiver B happens to disconnect from the network, receiver C now needs to find a new parent node to receive data. If receiver C moves to be a child of receiver E, there would be a 3 second delay before any data at all could be sent from receiver E to receiver C and receiver C would already have 3 seconds more data than receiver E has even received yet. The result is that receiver C begins to burn off its playback buffer without it being replenished, which makes the time-based error detection system start to develop a hair trigger response, and for all intents-shrinks its total workable buffer size.

To overcome this problem, each receiver in the network, as shown in the chart in FIG. 3, may have a predetermined time circle, such as 4 seconds. Thus, when a node is placed on the Y axis, based on their time behind the streaming unit's packet clock, the system can select a peer that is only plus or minus 2 seconds from its own latency which is shown in the chart by nodes that have overlapping time circles. The actual time period is adjustable as it defines the range of acceptable amounts of time that the stacks of the receivers can gain or lose and it actually establishes a network that utilizes a time-based hierarchy (opposed to a tree's physical root-down hierarchy) to the hp2p network as a whole. The time gradient between a data stream receiver and streaming unit is determined by the data stream receiver reporting through the CP/Control subsystems at certain intervals, the specific timecode that is currently at the top of its stack. The streaming unit then calculates the difference in time between the packet at the top of it's stack and the timecode that the data stream receiver is reporting. This value is then stored internally within the streaming unit for use in the data stream receiver placement routines (in which the parent child relationships between the data stream receivers are set up.) Once the time gradient for each data stream receiver is determined (as shown in FIG. 3), the data stream receivers with similar time gradients may be grouped together and used to form a channel by a channel selector unit that is part of the streaming unit and may be implemented in software.

Thus, peer motion between nodes is then restricted, and clusters of high latency nodes can form separate clusters, away from the low latency nodes. In addition, in-between "bridging" nodes can also exist such as receiver D in FIG. 3. If receiver C pushes data to receiver D, and receiver D pushes to receiver E, then if receiver D can push data fast enough to bring up receiver E's time latency, then receiver D essentially acted like a bridge to bring up receiver E into the range of receiver C's time circle. These bridges provide a smooth way for receivers to potentially repair their latency over time, and not in one giant leap to the least latent area-which could have the potential of overloading a node's bandwidth to burst the missing data.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A real-time data streaming system, comprising:
   mean for originating a data stream having at least two portions, wherein each of the at least two portions of the data stream includes a different part of the data stream, the data stream originator having a component that encapsulates data from media encoders into a format for distribution by the data stream originator; and
   a means for transmitting the data stream to a first data stream receiver, wherein the data stream receiver is a stream destination, and the data stream is transmitted via a path from the data transmitter device through one or more second data stream receivers and wherein the data stream that arrives at the stream destination has followed one or more channels through the one or more second data stream receivers so that the at least two portions of the data stream are split and then recombined at the stream destination to reform the data stream wherein for each of the second data stream receivers, the second data stream receiver is configured to select a peer second data stream receiver if a packet clock of a streaming unit at the peer receiver is within plus or minus a predetermined time period from a latency of the second data stream receiver that selects the peer receiver.

2. The system of claim 1, wherein the mean for originating further comprises a computer based streaming unit that configures the particular paths of the channels and streams the stream to the one or more second data stream receivers.

3. The system of claim 2, wherein the computer based streaming unit further comprises a time gradient unit that sets a time gradient for each of the first and second data stream receivers wherein the time gradient is an amount of stream data to be held by a stack of a particular data stream receiver.

4. The system of claim 1, wherein the stream further comprises one of a video stream, an audio stream, and a text stream.

5. The system of claim 2, wherein each data stream receiver further comprises a processing unit based device.

6. The system of claim 1, wherein each channel follows a particular path through the one or more data stream receivers.

7. The system of claim 6, wherein the particular path through the one or more data stream receivers is configurable.

8. The system of claim 3, wherein the computer based streaming unit further comprises a unit that selects a set of the second one or more data stream receivers in a channel that have similar time gradients.

9. A streaming-communication/delivery method for split-streaming streaming-content media from a streaming unit to a field of a plurality of data stream receivers, the method comprising:
   means for providing one or more early stage data stream receivers that are connected to a streaming unit;
   means for providing a distribution pattern of stream channels from the one or more early stage data stream receivers to the other data stream receivers in a field of a plurality of data stream receivers;
   means for distributing at least two portions of a stream, wherein each portion contains a different part of the stream, to each data stream receiver using the field of a plurality of data stream receivers;
   means for recombining the two portions of the stream to form the stream at the data stream receivers; and
   for each of the data stream receivers, means for selecting a peer receiver if a packet clock of a streaming unit at the peer receiver is within plus or minus of a predetermined time period from a latency of the data stream receiver that selects the peer receiver.

10. The method of claim 9 further comprising:
    means for assigning a time gradient for each data stream receiver wherein the time gradient is an amount of stream data to be held by a stack of a particular data stream receiver.

11. The method of claim 10 further comprising:
   means for selecting a set of data stream receivers in a channel that have similar time gradients.

12. The method of claim 9 wherein each channel follows a particular path through the one or more data stream receivers.

13. The system of claim 12, wherein the particular path through the one or more data stream receivers is configurable.

14. The method of claim 9 further comprising:
   means for reconfiguring the channels.

15. The method of claim 9, wherein the stream further comprises one of a video stream, an audio stream, and a text stream.

16. The method of claim 9 further comprising:
   means for selecting a set of the second one or more data stream receivers in a channel that have similar time gradients.

\* \* \* \* \*